United States Patent
Galmes et al.

(10) Patent No.: US 8,094,331 B2
(45) Date of Patent: Jan. 10, 2012

(54) PRINTER HAVING A MEDIA DATABASE AND WEB SYSTEM SERVICE

(75) Inventors: Jose Galmes, Barcelona (ES); Carlos Millan, Barcelona (ES); Josep Vallverdu, Barcelona (ES); Jordi Vilar, Barcelona (ES); Sebastian Matias Ybarra, Barcelona (ES)

(73) Assignee: Hewlett-Packard Development Company, L.P., Houston, TX (US)

(*) Notice: Subject to any disclaimer, the term of this patent is extended or adjusted under 35 U.S.C. 154(b) by 1629 days.

(21) Appl. No.: 11/441,119

(22) Filed: May 26, 2006

(65) Prior Publication Data
US 2007/0273920 A1 Nov. 29, 2007

(51) Int. Cl.
*G06F 3/12* (2006.01)
*G06F 15/00* (2006.01)

(52) U.S. Cl. ......................... 358/1.15; 358/1.9
(58) Field of Classification Search .................. 358/1.1, 358/1.9, 1.13, 1.15, 474, 3.23, 500, 515, 358/518; 382/162, 164, 167
See application file for complete search history.

(56) References Cited

U.S. PATENT DOCUMENTS

| | | | |
|---|---|---|---|
| 2003/0110413 A1* | 6/2003 | Bernklau-Halvor | 714/25 |
| 2003/0202210 A1* | 10/2003 | Anderson | 358/1.18 |
| 2005/0116980 A1* | 6/2005 | Nakahanada et al. | 347/19 |
| 2005/0117948 A1* | 6/2005 | Hatta et al. | 400/62 |
| 2005/0138065 A1* | 6/2005 | Ciriza | 707/104.1 |
| 2007/0121141 A1* | 5/2007 | Takabayashi et al. | 358/1.9 |

FOREIGN PATENT DOCUMENTS

| EP | 1 246 058 | 10/2002 |
|---|---|---|
| EP | 1 465 052 | 10/2004 |
| EP | 1 549 014 | 6/2005 |

* cited by examiner

*Primary Examiner* — Gabriel Garcia

(57) ABSTRACT

A printer, system, method and computer program for printing, the printer comprising: a media database arranged to store print media data; a web service system arranged to implement a web service; and communication means for communicating data stored in the media database to a user via the web service. The printing supports media extensibility, and information relating to the printing media, such as color profiles, can be communicated between a user and the printer via a web service.

19 Claims, 1 Drawing Sheet

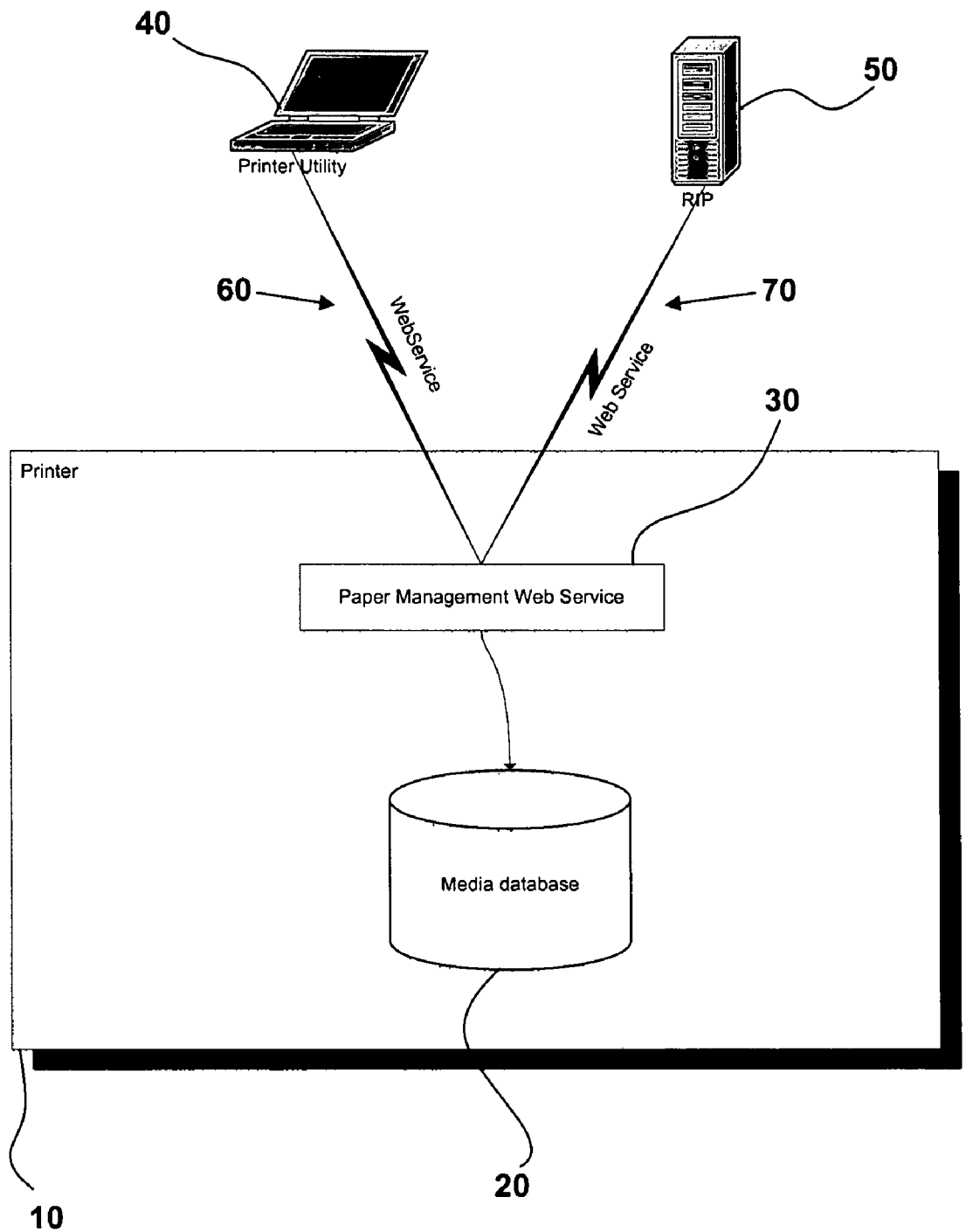

PRINTER HAVING A MEDIA DATABASE AND WEB SYSTEM SERVICE

The present invention relates generally to the field of printing, and more particularly to a printer, method, apparatus and computer program for printing that enables information relating to the print media, such as color profiles, to be communicated between a user and a printer.

Within the field of printing, a color profile typically describes the color reproduction characteristics of a print medium and is sometimes known as an "output profile". It can be appreciated that different printing media have different color profiles.

Furthermore, in the field of printing, the term 'media extensibility' typically refers to the ability of an end user to extend the set of media that a printer supports. In other words, media extensibility relates to a user's ability to create new media and define the characteristics of the new media.

As a result, a printer that supports media extensibility must be able to generate color profiles for user-defined media.

Color profiles are typically used in two different ways. A first way of using a color profile is known as 'proofing' and consists of applying the color profile in a software application to emulate the color behaviour of a printer on a different device, for example another printer or on-screen. For example, a user may wish to view an on-screen representation of how colors will look like when printed on a given medium.

A second way of using color profiles is to print on a particular medium. In this situation, a printer driver is used to apply the color profile when rendering the print job so that it generates the correct device colors for the specific medium used.

In both cases, the necessary color profile(s) must be stored in the host computer.

It is therefore desirable to realise a method and/or system for printing which supports media extensibility and enables color profiles generated/resident in the printer to be made available to a host computer.

According to the invention, there is provided a printer comprising:
 a media database which stores print media data;
 a web service system arranged to implement a web service; and
 communication means for communicating data stored in the media database to a user via the web service.

According to a second aspect of the invention, there is provided a system for printing comprising:
 processing means for creating or processing a document to be printed; and
 a printer of the first aspect of the invention,
 wherein the printer is further arranged to receive the document to be printed via the communication means.

According to a further aspect of the invention, there is provided a method of printing a document, comprising:
 storing print media data in a media database of the printer;
 updating the print media data in the media database by communicating between a user and the media database via a web service system of the printer;
 communicating a document to be printed to the printer; and
 printing the document using the updated print media data The invention also provides a computer program comprising computer program code means adapted to perform the method of the invention when said program is run on a computer.

Thus, the invention provides for printing which supports media extensibility. It also enables information relating to the printing media, such as color profiles, to be communicated between a user and the printer, the communication being implemented via a web service.

An example of the invention will now be described in detail with reference to the accompanying drawings, in which:

FIG. 1 shows an overview of a system for printing according to an embodiment of the invention.

Referring to FIG. 1 a printer 10 comprising a media database 20 and means for providing a web service 30 is arranged to be in communication with a user workstation 40 and a Raster Image Processor (RIP) 50 via communication links 60 and 70 respectively.

The media database 20 comprises storage means, for example magnetic storage media, arranged to store data relating to print media. The data contains information relating to the characteristics of print media and, in particular, information relating to the color profiles of the print media. In other words, the media database 20 is a media repository where media information data is stored.

The media database 20 enables, amongst other features, the addition of custom media, the alteration of media parameters and the deletion of media. Thus, it allows the printer 10 to support media extensibility through enabling an extensible set of print media.

The means for providing a web service 30 are arranged to implement a web service hereinafter referred to as a "Paper Management Web Service" (PMWS).

A "Web Service" is a software system designed for interactions over a communications network. It has an interface that is described in a machine-processable format such as Web Services Description Language (WSDL). This interface description is then published, to enable third parties to communicate over the interface in accordance with the defined protocol.

Other systems can interact with the PMWS in a manner prescribed by the interface description using suitable formatted messages. These messages are typically conveyed using HyperText Transfer Protocol (HTTP), and typically comprise Extensible Markup Language (XML) in conjunction with other Web-related standards. More specifically, Web service clients send an XML document formatted in accordance with the rules of the Simple Object Access Protocol (SOAP) specification.

XML is a general-purpose markup language for creating special-purpose markup languages, capable of describing many different kinds of data. Its primary purpose is to facilitate the sharing of data across different systems, particularly systems connected via the Internet.

It will, therefore, be appreciated that the PMWS provides a front end to the media database by enabling other systems to interact with the media database 20.

This web service is available for either proprietary utilities, such as a user terminal 40, or third party applications, such as a RIP 50, via a suitable communication link. In the illustrated embodiment, the user terminal 40 is in communication with the PMWS via an internet network connection 60, whereas the RIP 50 is connected to the PMWS via Wireless Local Area Network (LAN) connection 70. However, the reader will realise that the specific communication links employed are not essential to the invention and, in alternative embodiments of the invention, any such suitable communication link may be used to communicate with the PMWS.

Using the PMWS data can be exchanged between the user terminal 40 or the RIP 50 and the media database 20 over the communication links 60 and 70. This data exchange can take place with software applications written in various programming languages, and running on various platforms. Thus, data stored in the media database 20 can be communicated to a user via the PMWS, and vice-versa, regardless of the particular user hardware and software of the user.

The PMWS enables the functionality outline above by providing the following methods:
Get Medium List;
Get Medium Category List;
Create New Custom Medium;
Delete Custom Medium;
Set Color Profile Name;
Get Medium List Version;
Get Color Profile;
Set Color Profile; and
Set Medium Properties.

The PMWS is arranged to communicate directly with the media database 20 for the above operations. All of the PMWS methods are synchronous and can be executed while the printer is in any state (i.e. printing, processing, etc.) so that there is no need to stop, or lock, a printing engine of the printer 10.

For a better understanding of the invention, the methods provided by the PMWS will now be described in greater detail.

Get Medium List

This method returns a list of all available print media (user-defined and built-in). The PMWS receives a GetMediumList request with the only optional argument being the language in which the media names are to be localized. However, if the language is not specified or invalid, the method may provide for a default language to be used, such as US English.

The PMWS retrieves a list of media from the data stored in the media database 20 and communicates the list to the user, along with the version of the list. The list contains information relating to all of the media defined, built-in and custom.

Table 1 shows one example of the possible information that may be returned for each medium.

TABLE 1

| Parameter | | Description |
| --- | --- | --- |
| Identifier | | Unique medium identifier for this printer. |
| Version | | Version for this medium. It changes when anything in the media changes (the media is profiled, the media is calibrated, a calibration expires, etc.) |
| PrintingId | | Unique medium identifier across printers. This is the ID that shows in the PDL (printer description language) headers when printing a job. The printer utility makes those PrintingIds available to printer drivers so that drivers can generate the right headers. |
| Parent | | Medium from which it was cloned. Undefined (−1) if built-in. |
| Localization | | Indicates the local language, the vendor name and the medium name |
| CategoryId | | Logical media category for display purposes. |
| Seq. of Profile | Profile key | A unique identifier for a print profile, specifying print quality, level of detail, gloss enchancer and colour space settings |
| | User | User that last modified the profile. |
| | Date | Date when the profile was set, either via setProfile or newProfile. The host along with the request passes this date. |
| | Preset Name | Name assigned by the user when the profile was generated. |
| | Name | Informative name (for instance, to show in printer utility. This name matches the profile's internal name. |
| | Checksum | Profile's Checksum that can be used by host tools to check whether the profile has changed. |
| Seq. of Calibration | User | User that triggered the calibration. |
| | Date | Date when calibration was done. |
| | Obsolete | Indicates whether calibration has expired. |
| Properties | Gloss enhancer | Whether the media supports gloss enhancer. |
| | MaxDetail | Whether the media supports maximum detail. |
| | Extra Passes | Whether the media supports extra passes. |
| | Scanning | Whether the media can be calibrated or profiled. |
| | Clonable | Whether the medium can be cloned. The printer utility uses this flag to filter the media list when offering a "parent" medium from which to clone. Custom media are not clonable. |
| | Variable PRS | Whether Pen to Rib Spacing (PRS) can be changed for this medium. |
| | Borderless | Whether the medium accepts borderless printing. |
| | Variable Properties | Indicates the following properties: Pen-to-Rib Spacing; DryTime; Cutter; and InkVolume |

Get Medium Category List

The PMWS receives a GetMediumCategoryList request. The only optional argument is the language in which the media names are to be localized. If the language is not specified or invalid, it defaults to US English. The PMWS then returns the list of media categories, the list being sorted as may be necessary.

Create New Custom Media

This method clones one of the existing media stored in the printer, by copying an existing media in the printer 10 by duplicating the relevant media information data that is stored in the media database 20. In order to distinguish the coped media from the "parent", the copied media is given a new user-provided name.

More specifically, the PMWS receives a NewCustomMedium request and communicates with media database 20 to the duplicate necessary media.

The profiles associated with the new medium are renamed, for example as:

<prn>_<pa>_<pq>_<ge>_<pre> wherein: prn=Printer's Model Name; pa Paper Name; pq=Print Quality; ge=Gloss Enhancer; and pre=Preset.

Upon success, the PMWS returns an OK message and the new medium, new media always belonging to a predefined category known as "custom".

This new custom medium can then be stored in the user's host computer.

Upon failure, the PMWS returns one of the error codes listed in Table 2, and the medium is undefined.

TABLE 2

| Result | Description |
| --- | --- |
| MEDIUM-NOT-CLONABLE | The specified medium either doesn't exist or cannot be cloned. This should never occur in practice as long as PMWS's clients are restricted to the clonable media obtained by the GetMediumList method above. |
| MEDIUM-ALREADY-EXISTS | The medium already exists. Two media cannot have the same name/vendor pair in any of the localizations. |
| NO-ROOM-FOR-NEW-MEDIA | The media database is full. |

Delete Custom Medium

This method deletes a user-defined medium from the media database 20. The PMWS receives a DeleteCustomMedium request with a parameter 'Mediumid' identifying the media to be deleted (this must be one of the medium identifications returned by the GetMediumList method). The PMWS then attempts to delete the specified medium from the media database 20 by marking the related data as "deleted". Upon success, the PMWS returns OK. Upon failure, the PMWS returns one of the following error codes:

MEDIUM-CANNOT-BE-DELETED (if the medium specified is not custom and, therefore, cannot be deleted); and MEDIUM-DOESNT-EXIST (if the medium specified does not exist).

It is noted that the medium will be deleted even if it is currently loaded in the printer engine. Deleting a media will not immediately delete all of its resources. Instead, it will mark the media as "deleted" and will not show up in any subsequent calls (for example, GetMediumList).

Set Color Profile Name

The PMWS receives a SetProfileName request with input parameters as described in Table 3.

TABLE 3

| Parameter | Description |
| --- | --- |
| MediumId | Unique medium identifier |
| User | |
| Date | |

TABLE 3-continued

| Parameter | Description |
| --- | --- |
| ProfileKey | A unique identifier for a print profile, specifying print quality, level of detail, gloss enchancer and colour space settings |
| ProfileName | UTF-8 encoded name. This is used to show up in user interface in host tools. |

The PMWS then attempts to set the name of the profile by communicating the information to the media database 20. Upon success, the PMWS returns OK, otherwise the PMWS returns an error code. For example, if the profile specified does not exist, the error code 'PROFILE-DOESNT-EXIST' is returned, and if the specified medium does not exist, the error code 'MEDIUM-DOESNT-EXIST' is returned.

Get Medium List Version

In this method, the PMWS receives a GetMediumListVersion request with no input parameters. The PMWS then communicates a version of the medium list to the originator of the request, the information being obtained from the media database 20.

The list version may change, for example, when a new medium is added to the media database 20, when a medium is deleted or renamed, when a new color profile is created for a medium, or when a color profile is restored to a factory default.

Get Color Profile

This method communicates a color profile stored in the media database 20 to an originator of the request. The PMWS receives a GetColorProfile request and retrieves the color profile information from the media database. Upon success, the PMWS also returns OK, otherwise the PMWS returns an error code. For example, if the profile specified does not exist in the media database 20, the error code 'PROFILE-DOESNT-EXIST' is returned, and if the specified medium does not exist in the media database 20, the error code 'MEDIUM-DOESNT-EXIST' is returned.

Set Color Profile

This method communicates a color profile resident in the user's computer (or provided by the originator of the method request). The PMWS receives a SetColorProfile request with input parameters as described in Table 4.

TABLE 4

| Parameter | | Description |
| --- | --- | --- |
| MediumId | | Unique medium identifier |
| User | | |
| Date | | |
| ProfilingTicket | ProfileKey | A unique identifier for a print profile, specifying print quality, level of detail, gloss enchancer and colour space settings |
| | ProfileName | The name to be set inside the profile. |
| | PresetName | The profile's intent. |
| ProfileContents | | The profiler itself, encoded as base64. The ProfileContents do not contain the new name, which has to be set in the printer's side. |

The PMWS then attempts to set the necessary color profile information in the media database 20. Upon success, PMWS returns OK, otherwise the PMWS returns an error code. For example, if the profile specified does not exist in the media database 20, the error code 'PROFILE-DOESNT-EXIST' is returned, and if the specified medium does not exist in the media database 20, the error code 'MEDIUM-DOESNT-EXIST' is returned.

Set Medium Properties

This method allows an originator of the method request to change characteristics of a specified medium. For example, media characteristics such as pen to paper spacing, dry time, and amount of ink the medium can take can be altered.

Initially, the PMWS receives a SetMediumProperties request containing input parameters as described in Table 5.

TABLE 5

| Parameter | | Description |
|---|---|---|
| MediumId | | Unique medium identifier. |
| Localizations | Sequence of Localization | If some language is missing, the US English (en_US) localization will be copied in its place. If en_US is missing, the first localization will be used instead. |
| Variable Properties | | Indicates the following properties: Pen-to-Rib Spacing; DryTime; Cutter; and InkVolume. |

The PMWS then attempts to set the necessary information stored in the media database 20. Upon success, PMWS returns OK, otherwise PMWS returns an error code. For example, if the specified medium does not exist, the error code 'MEDIUM-DOESNT-EXIST' is returned.

It can be appreciated that the PMWS uses open standards and protocols. By utilizing HTTP, the PMWS can work through many common firewall security measures without requiring changes to firewall filtering rules. Other forms of remote procedure calls are often blocked by firewalls.

The PMWS also enables software and services from different companies and locations to access the media database 20, the information stored therein, thereby providing a flexible printing service with improved levels of interoperability.

Custom protocols derived for specific applications are typically difficult to develop and integrate. Unlike such custom protocols, the invention employs an industry standard protocol, therefore making it easy for third parties to develop software applications that can communicate with a system or printer implementing the invention.

It can be seen from the above description that the use of a web service to implement communication between a printer media database and a user provides improved flexibility in the management of printer media data. In particular, printer clients can establish complex conversations with printers. The example of the invention described above provides printers which implement web services, to (at least) export color profiles and manage media.

The web service definition of the implemented web service is published by the printer manufacturer, typically using WSDL documents. These published web service definitions then enable clients to communicate with the printer using the defined web service.

One main ability of the system is to enable colour profiles computed by the printer to be exported to the host, but in addition media definitions in the printer can be managed by the host, by allowing the creation of new custom media, deletion of existing media, and enabling printing parameters and media parameters to be changed.

As described above, the main data content transmitted between the user and the printer will take the form of color profile data. However, other data can be managed as will be apparent from the description above.

The implementation of the web service system will be routine to those of ordinary skill in the art. The web service description language (WSDL) specifications are available from the W3C web site. A WSDL document can be treated as two related but logically distinct sections: the abstract description which describes the functional behaviour of the web service; and the binding which describes how messages should be serialized onto some underlying protocol to send to the web service. These messages take the form of XML documents, for transmission using the HTTP protocol.

The WSDL document thus provides the information required for third parties to access and invoke the web service, which in this case enables management of the printer media database and the transmission of data to and from the media database. The WSDL document is typically published in a services registry, although the web service can simply be identified by a URI (universal resource indicator) in the same way as a conventional website.

Other colour resources besides color profiles may be stored in the media database, for example linearization curves, ink limits or halftone parameters.

The web service system will typically comprise an appropriately programmed computer system.

Various other modifications will be apparent to those skilled in the art.

We claim:

1. A printer comprising:
   a media database which stores print media data for an existing set of print medium types supported by the printer;
   a web service system arranged to receive from a user additional print medium data for an additional print medium type defined by the user and added to the existing set, and to store the additional print medium data in the media database, wherein the additional print medium data describes color reproduction characteristics of a print medium of the additional print medium type to correctly render device colors on the print medium; and
   communication means for communicating data stored in the media database to the user via a web service implemented by the web service system.

2. A printer as claimed in claim 1, wherein the print media data comprises a color profile of a printing medium.

3. A printer as claimed in claim 1, wherein the web service system is arranged to communicate information relating to the data stored in the media database to the user via the communication means.

4. A printer as claimed in claim 3, wherein the data stored in the media database comprises a list of all available print media.

5. A printer as claimed in claim 2, wherein the web service system is arranged to communicate a color profile stored in the media database to the user via the communication means.

6. A printer as claimed in claim 2, wherein the web service system is arranged to receive a color profile via the communication means and store the color profile in the media database.

7. A system for printing comprising:
   processing means for creating or processing a document to be printed; and
   a printer as claimed in claim 1,
   wherein the printer is further arranged to receive the document to be printed via the communication means.

8. A printer as claimed in claim 1, wherein the print media data for a given print medium type is usable to accurately proof a desired image on an output device different from the printer so as to emulate the color behavior of the given print medium type.

9. A printer as claimed in claim 1, wherein the print media data comprises a linearization curve of a printing medium.

10. A printer as claimed in claim 1, wherein the print media data comprises ink limits of a printing medium.

11. A method of printing a document, comprising:
storing print media data for an existing set of print medium types supported by a printer in a media database of the printer;
updating the print media data in the media database by communicating between a user and the media database via a web service system of the printer to add additional print medium data for an additional print medium type defined by the user and added to the existing set,
wherein the additional print medium data describes color reproduction characteristics of a print medium of the additional print medium type to correctly render device colors on the print medium;
communicating a document to be printed to the printer; and
printing the document using the updated print media data.

12. A method according to claim 11, wherein the media data comprises a color profile of a printing medium.

13. A method according to claim 11, wherein updating the print media data comprises creating new print medium data defined by the user and storing information relating to the new print medium data in the media database.

14. A method according to claim 11, wherein updating the print media data comprises deleting print medium data selected by the user by removing data relating to the selected print medium from the media database.

15. A method according to claim 11, wherein updating the print media data comprises accessing a list of all available print media stored in the media database.

16. A computer program comprising computer program code means adapted to perform all of the steps of claim 11 when said program is run on a computer.

17. A computer program as claimed in claim 16 embodied on a computer readable medium.

18. A printer comprising:
a media database which stores print media data for an existing set of print medium types supported by the printer;
a web service system arranged to receive from a user additional print medium data for an additional print medium type defined by the user and added to the existing set, and to store the additional print medium data in the media database, wherein the additional print medium data describes an ink receiving characteristic of a print medium corresponding to the additional print medium type; and
communication means for communicating data stored in the media database to the user via a web service implemented by the web service system.

19. A printer as claimed in claim 18, wherein the ink receiving characteristic includes a pen-to-paper spacing to print on the print medium, a dry time associated with the print medium, or an amount of ink the print medium is capable of receiving.

* * * * *